March 24, 1936.  C. BRAUNE ET AL  2,035,281
AERIAL TRAMWAY
Filed April 9, 1934  3 Sheets-Sheet 1
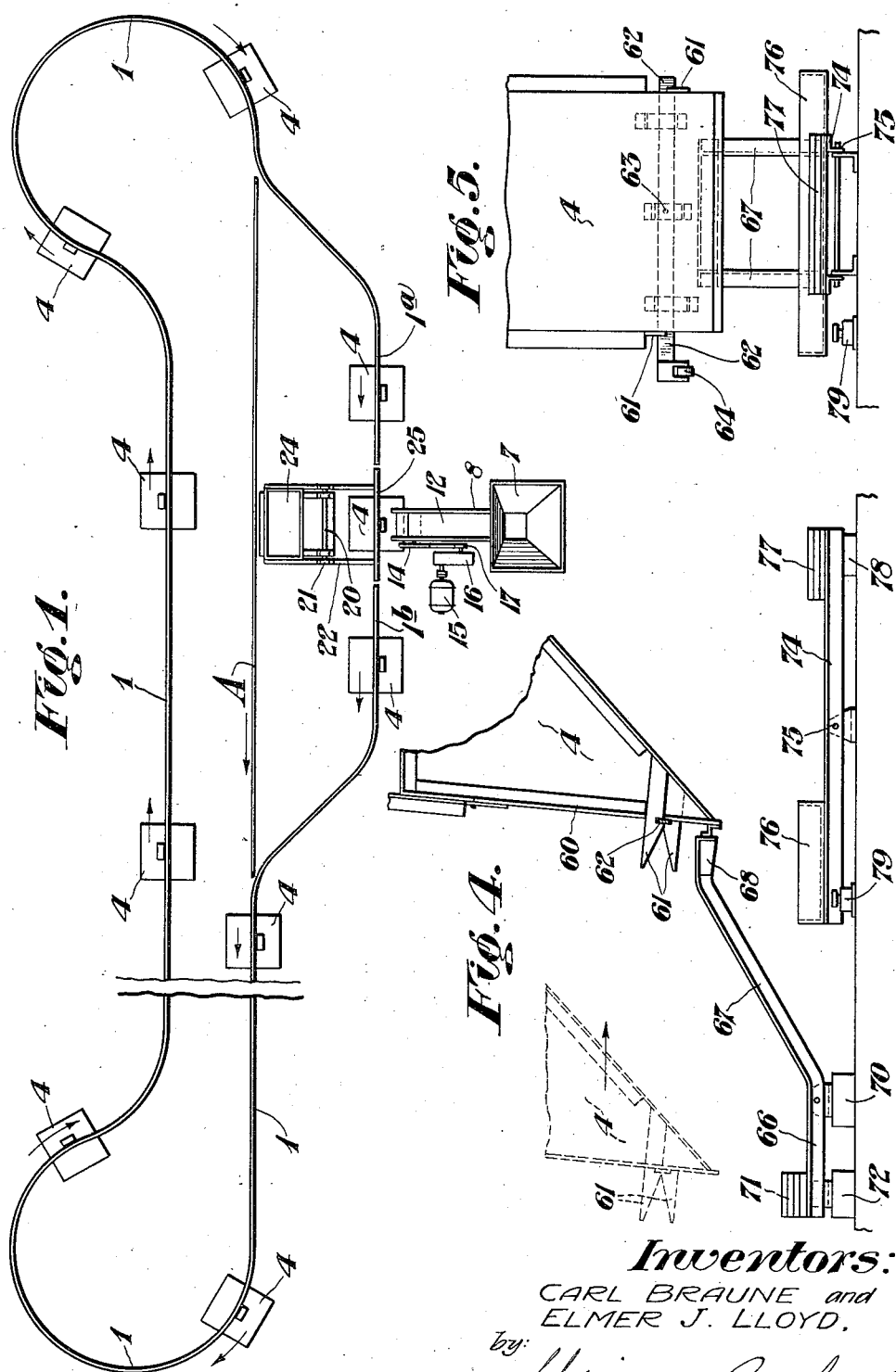
Inventors:
CARL BRAUNE and
ELMER J. LLOYD.
by: Usina + Rauber
their Attorneys.

March 24, 1936.   C. BRAUNE ET AL   2,035,281
AERIAL TRAMWAY
Filed April 9, 1934   3 Sheets-Sheet 2
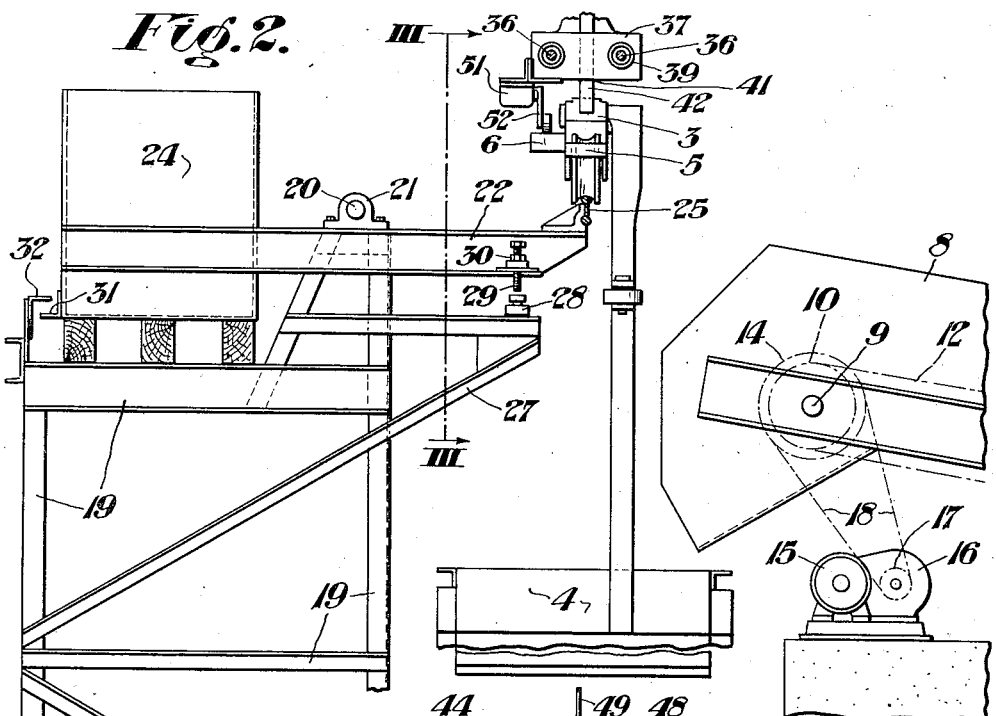
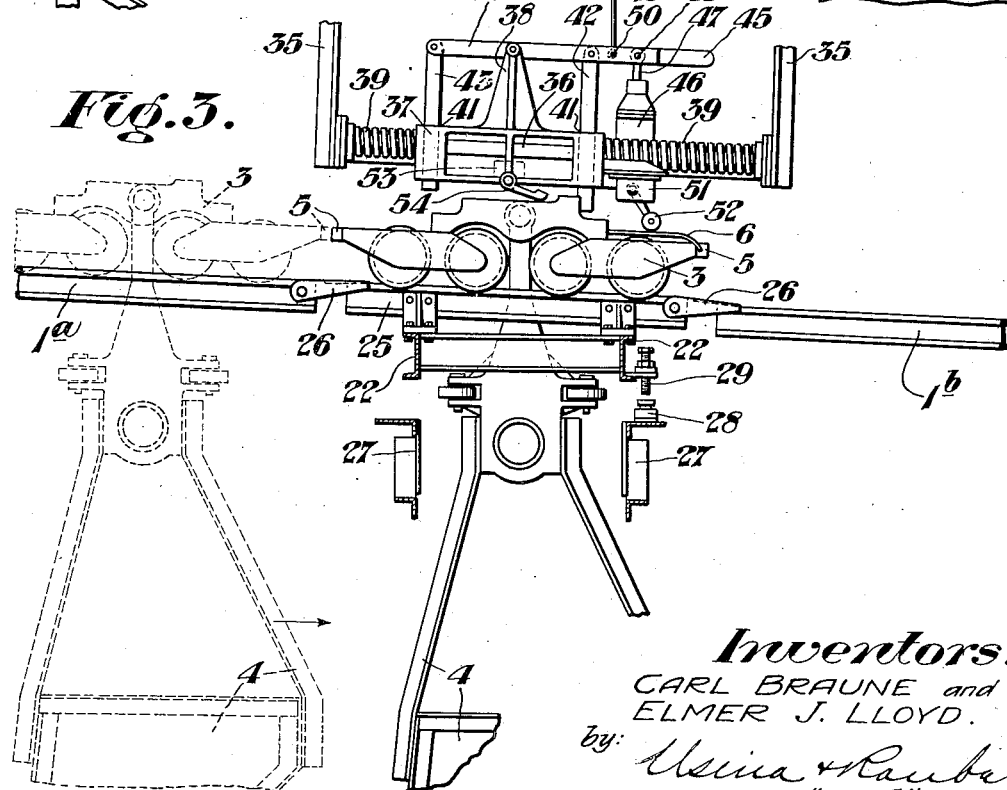
Inventors:
CARL BRAUNE and
ELMER J. LLOYD.
by: Usina & Rauber
their Attorneys.

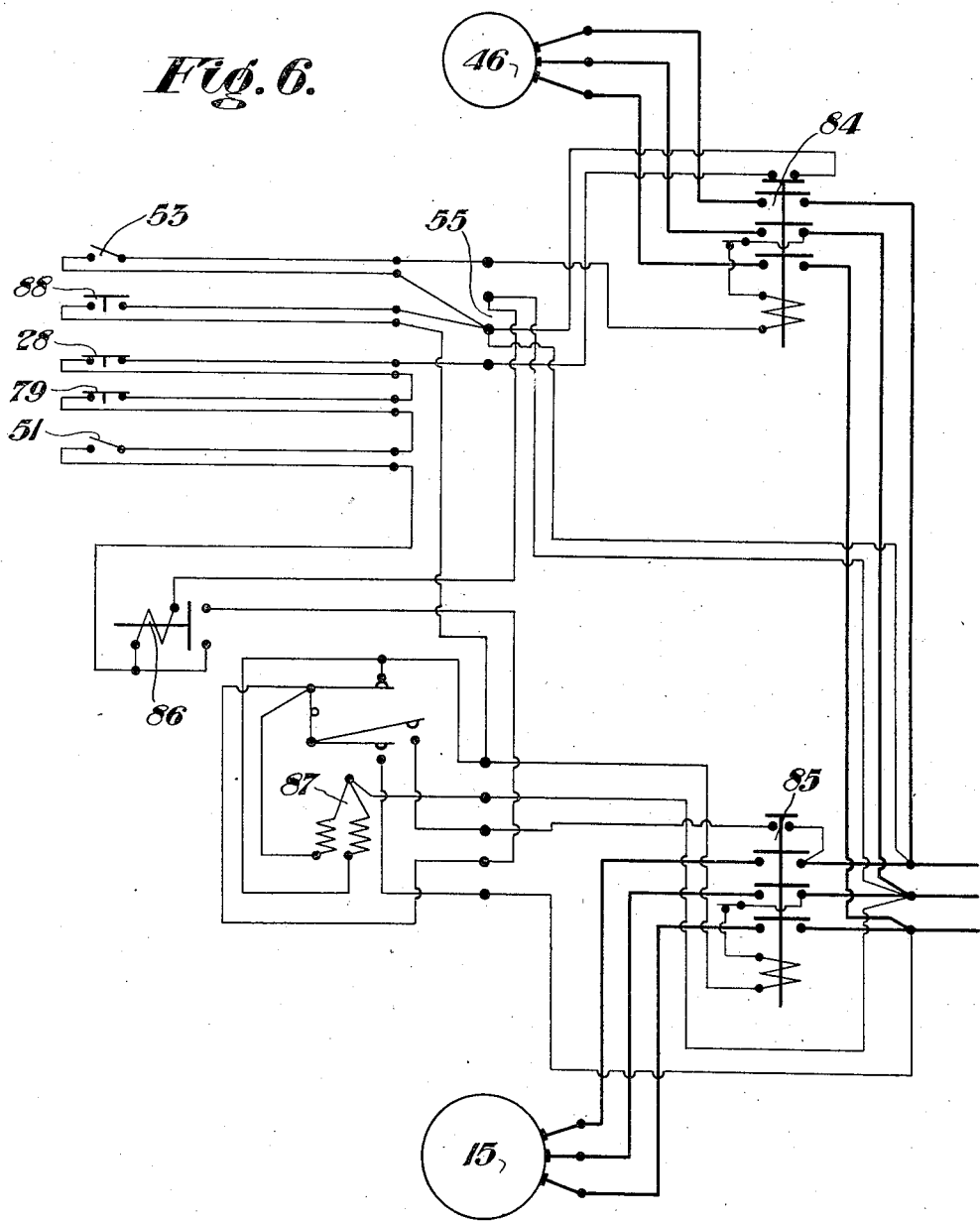

Patented Mar. 24, 1936

2,035,281

UNITED STATES PATENT OFFICE 2,035,281

AERIAL TRAMWAY

Carl Braune and Elmer J. Lloyd, Worcester, Mass., assignors to The American Steel and Wire Company of New Jersey, a corporation of New Jersey Application April 9, 1934, Serial No. 719,797

2 Claims. (Cl. 214—41)

This invention relates to aerial tramways, and more particularly to those employing a continuous overhead trackway and an endless tramway cable having a plurality of carriages attached thereto at spaced intervals.

Aerial tramways of the class described are made to extend over a considerable area and are provided with one or more unloading stations, together with a loading station on a siding which deviates from the endless continuously driven tramway cable. The various carriages attached to the cable have carriers pivotally attached thereto. As the carriages approach the incoming tracks of the siding of the loading station, the connection of the carriage with the endless tramway cable is broken and it moves by gravity over a graded track to the loading station, where it is detained, loaded, and released, after which it moves by gravity over the outgoing track of the loading station and back to a position adjacent the cable to which it is automatically attached.

A tramway of this type is disclosed in United States Patent No. 1,760,077, to Morrison, dated May 27, 1930, together with the specific manner in which the carriages are connected and disconnected to the endless tramway cable, and is used in combination with a novel "dispatcher" or bucket spacing mechanism arranged at the loading station, where the material to be conveyed is loaded into the carriers from an adjacent storage bin. While generally efficient in operation, aerial tramways of this type present numerous difficulties which give rise to a considerable waste of time and money, if extreme vigilance is not maintained over the conveyer and other equipment at the loading station.

One object of the present invention is the provision of a novel aerial tramway having a counterbalanced track section at its loading station, upon the depression of which means are initiated for detaining, loading and releasing the carriage in a fully automatic manner.

Another object is the provision of a novel aerial tramway of the type described having means for automatically closing the discharge doors of the various carriers as they are brought into position adjacent the loading conveyer, together with automatically actuated means for detecting the possible failure of the door closing means and discontinuing the operation of the loading conveyer, all of said means being operable upon the depression of the counterbalanced track section of the invention.

The foregoing and further objects will be apparent after referring to the drawings, in which:

Figure 1 is a plan of part of the novel apparatus of the invention, together with the conveyer to which it is applied.

Figure 2 is an end elevation of a part of the apparatus of Figure 1.

Figure 3 is a side elevation of a part of Figure 2.

Figure 4 is a side elevation of a conveyer carrier together with several devices which are disposed at the loading station.

Figure 5 is an end view of the apparatus of Figure 4.

Figure 6 is a wiring diagram for operating the electrical devices which are associated with the apparatus of the invention.

Referring more particularly to the drawings, the letter A designates a continuously driven tramway conveyer cable extending over a comparatively large area and having detachably connected thereto a plurality of conveyer carriages. An overhead track 1 is made to substantially parallel the greater portion of the continuously driven cable A, and is provided with a deviating portion in order that a loading station may be established. That portion of the track which deviates from the cable to the loading station is indicated at 1ª, while the outgoing track from the loading station back to the tramway cable is indicated at 1ᵇ.

The track 1 is suitably graded, in order that various carriages 3 may be automatically detached prior to traveling over the incoming track 1ª of the loading station and be permitted to move by gravity down the outgoing track 1ᵇ and become automatically attached to the cable A, as described in the Morrison patent previously mentioned. Conventional types of graded rails and braking devices may be used, but as such form no part of the present invention, and accordingly are neither shown nor described.

Each of the carriages 3 pivotally supports a carrier 4. A bumper 5 is mounted on each end of each of the carriages 3 and a tripper shoe secured to their upper portions.

A storage bin 7, for containing the material which the conveyer is intended to transport, is disposed on one side of the tracks 1ª and 1ᵇ, provided with a discharge chute 8. A conveyer is provided for assisting material out of the discharge chute 8, and comprises a shaft 9 which is journaled in the discharge chute and carries a roll 10. A similar shaft and roll (not shown) are disposed more adjacent the center of the bin 7, and an apron type conveyer belt 12 is disposed around its roll and around the roll 10 on the shaft 9. The shaft 9 also carries a pulley 14 which receives rotation from a motor 15 through a gear reduction unit 16, the latter having a pulley 17 around which a belt 18 is disposed for establishing the driving connection.

A support 19 is disposed adjacent the bin 7, on the other side of the tracks 1a and 1b, and carries on its upper end a shaft 20. A pair of journals 21 are mounted on the shaft 20 and are secured to a table composed of a pair of beams 22. A ballast box 24 is mounted on the end of the tilting table composed of the beams 22, which is remote from the storage bin 7, while a track section 25 is mounted on its opposite end in such manner as to occupy the major portion of the opening between the track sections 1a and 1b.

A pair of hoods 26 are provided for bridging the gap between the incoming and outgoing tracks 1a and 1b, respectively, and the counterweighted track section 25, one being pivotally mounted on the track 1a and made to continuously contact the track section, while the other is pivotally mounted on the other end of the track section and made to continuously contact the end of the track 1b.

An extension 27 is secured to the support 19 and carries adjacent its end a push button switch 28. An adjustable plunger 29 is secured to one of the beams 22 of the tilting table in a position such as will enable it to actuate the switch 28, and is locked in adjusted position by means of a lock nut 30.

A limit stop 31 is secured to the outside end of the ballast box 24 and cooperates with a keeper 32, which is secured to the support 19, and functions to prevent excessive depression of the tilting table on its end carrying the track section 25.

An overhead support 35, which is maintained in position by any suitable means, carries a pair of horizontal rods 36 extending between its ends. The rods 36 extend through a housing 37 having a vertical extension 38 on its mid-portion. A spring 39 is disposed on each of the rods 36 between the ends of the support 35 and the ends of the housing 37. The housing 37 is provided with a pair of apertures 41 adjacent each of its ends, in each of which a shaft is slidably disposed, as at 42 and 43. A walking beam 44 is connected to the vertical extension 38 of the housing 37, and provided with an extension 45. A "thrustor motor" 46 is also secured to the housing 37 and provided with the usual "thrustor" rod 47, which is connected to the extension 45 of the walking beam 44, as at 48. A rod 49, which is suitably spring-loaded, is also connected to the extension 45 of the walking beam, as at 50.

A switch 51 is connected to the housing 37 and provided with a pivoted switch arm 52 which is adapted to make contact with the tripper shoe 6 on each of the wheeled carriages 3. A switch 53 is also connected to the housing 37 adjacent its mid-portion, and provided with a pivoted switch arm 54.

Referring to Figure 4 of the drawings, each of the carriers of the conveyer are provided with a discharge door 60. A latch 61 is connected to one side of each of the carriers 4 to cooperate with a latch bar 62 which is pivoted, as at 63, to the door. The outer end of each of the latch bars 62, for each of the carriers 4, is provided with a roller 64, for engaging a suitable trip mechanism to enable the discharge door 60 to open and release the contents of the carrier.

In order to assure the seating of the latch bar 62 in the latch 61, and accordingly completely close and fasten the door, a door closing mechanism is provided, and comprises a plate 66 having a diagonally upward extension 67 with a flattened extremity 68. The plate 66 is pivoted to a block 70 which is disposed on the floor of the loading station. The end of the pivoted plate 66 which is opposite the diagonally upward extension 67 carries a plurality of counterweights 71 to cause it to seat upon a block 72.

Upon the floor of the loading station, a tilting table 74 is pivotally supported adjacent its center, as shown at 75, and provided with a tray 76 which is disposed immediately beneath the flattened extremity 68 of the tilting plate 66. The other end of the tilting table 74 is counter-weighted, as at 77, to cause it to seat upon a block 78. A push button switch 79 is disposed beneath the counterweighted end of the table on which the tray 76 is mounted.

Referring to Figure 6 of the drawings, there is disclosed a diagrammatic layout of electrical adjuncts for the various devices of the invention, which operate through a junction box 55.

In operation, a carriage 3 is disengaged from the continuously driven tramway cable A, progresses by gravity over the incoming track 1a of the loading station, and moves onto the counterweighted track section 25. On the counterweighted track section 25, it engages the shaft 42 in one of the apertures 41 in the housing 37, which has been lowered by the disconnection of a magnetic switch 84 for the "thrustor motor" 46, and the action of the spring-loaded rod 49. At the same time, the tripper shoe 6, attached to the upper portion of the carriage 3, actuates the switch 51 through its arm 52, closing the circuit to a magnetic switch 85 for the motor 15 which drives the apron type conveyer belt 12. The starting of the motor 15 is delayed by a time delay relay 86 for a predetermined interval, in order that the swing of the tramway carrier 4, caused by the abrupt halt of the carriage 3, may be retarded.

As the carrier 4 moves into the loading station, it strikes the extension 67 of the tilting plate 66 and causes it to pivot. After the tilting plate moves back into position, and the carriage 3 stops, the backward swing of the carrier 4 will cause it to come in contact with the flattened portion 68 of the diagonally upward extension over which it has just passed. The impact caused by this contact will permit the pivoted latch bar 62 to seat in the latch 61 and thus assure the closure of the door 60.

The movement of the apron type conveyer belt 12 on the roll 10, and its counterpart (not shown) put in motion by the motor 15, moves the material to be conveyed from the bin 7 and into its discharge chute 8, from which it drops into the carrier 4. The counterweighted track section 25 is gradually weighted down sufficiently to overcome the weight of the ballast box 24 on the other end of the tilting table composed of the channels 22, and finally the adjustable plunger 29 will engage the push button switch 28 which is connected to the extension 27 of the support 19.

During the time the motor 15 for the conveyer belt 12 is actuated, a definite time relay 87 is also put in operation, and will stop the motor after a predetermined interval which is, in practice, a few seconds longer than the actual time required for loading the carrier. This operation eliminates excessive spillage from the conveyer belt 12 in the event that the push button switch 28 fails to function when the track section 25 overcomes its counterbalance.

If, for any reason, the door 60 of the carrier was not closed when the carriage 3 came to rest on the counterbalanced track section, and the material being loaded escapes therethrough, it will fall into the spillage tray 76 on the tilting table 74, and cause the latter to depress the push button switch 79, which will disconnect the motor 15 and cause the conveyer belt 12 to stop. As the motor 15 is stopped, the circuit to the "thrustor motor" 46 is made, causing the rod 47 to raise and lift the shaft 42 of the housing 37, thereby releasing the carriage.

As soon as the carriage 3 moves from the track section the switch arm 54 on the housing 37 drops, and causes the limit switch 53 to break the circuit to the "thrustor motor" 46, which permits the spring-loaded rod 49 to move downwardly and raise the shaft 43 to permit another carriage 3 to move onto the track section. As the unloaded carriage moves onto the track section, it encounters, the limit switch arm 54. Therefore, the actuation of the limit switch 53 in this manner permits the "thrustor motor" 46 to function, but only after the operation of the motor 15 is discontinued. The shaft 42 holds the carriage 3 in position. The movement of the carriage 3 onto the track section again initiates the operation of the motor 15 for the conveyer belt 12 through the switch 51 on the housing 37, which is actuated by its arm 52 making contact with the tripper shoe 6.

An emergency push button switch 88 is provided in the circuits for the controlling devices, and operates the motor 15 for the conveyer belt 12 independently of the automatic operation described.

The possibility of the simultaneous operation of the motor 15, and the "thrustor motor" 46 for releasing the carriage in the loading station, is entirely eliminated by the interlocking of their circuits.

It should be understood that other means may be used for operating the various devices of the invention in lieu of the electrical adjuncts and operating circuits disclosed, and that while we have shown one specific embodiment it will be understood that we do not wish to be limited exactly thereto, since various modifications may be made without departing from the scope of our invention, as defined in the following claims.

We claim:

1. In combination with a continuously driven tramway cable conveyer, a track section running substantially parallel to the greater portion of said continuously driven cable and deviating sufficiently at one point to provide a loading station, a driven loading conveyer, a section of said track being removed at said loading station, a counterweighted track section disposed in the opening provided by said removed section, at least one carriage arranged for association and dissociation with said cable, a carrier supported by said carriage, a discharge door on said carrier, means at said loading station for closing said discharge door, a pivoted table mounted directly beneath said counterweighted track section, a tray on said pivoted table adjacent its end nearest said carrier, a counterbalancing weight adjacent the other end of said pivoted table, means operable by the unbalancing of said pivoted table for discontinuing the operation of said loading conveyer, means adjacent said counterweighted track section to detain a carriage thereon, and means operable by the depression of said track section to release said carriage.

2. In combination with a continuously driven tramway cable conveyer, a track running substantially parallel to the greater portion of said continuously driven cable and deviating sufficiently at one point to provide a loading station, said track providing an opening at said loading station, a counterbalanced track section disposed in the opening in said track, a loading conveyer adjacent said counterbalanced track section, at least one carriage adapted for movement on said track, a carrier on said carriage, a discharge door on said carrier, fastening means for said door, means for detaining a carriage adjacent said loading conveyer, means for closing said door, means for initiating the operation of said loading conveyer, means for discontinuing the operation of said conveyer upon the failure of said door closing means, means for discontinuing the operation of said conveyer when said carrier is loaded, and means for releasing said carriage.

CARL BRAUNE.
ELMER J. LLOYD.